UNITED STATES PATENT OFFICE.

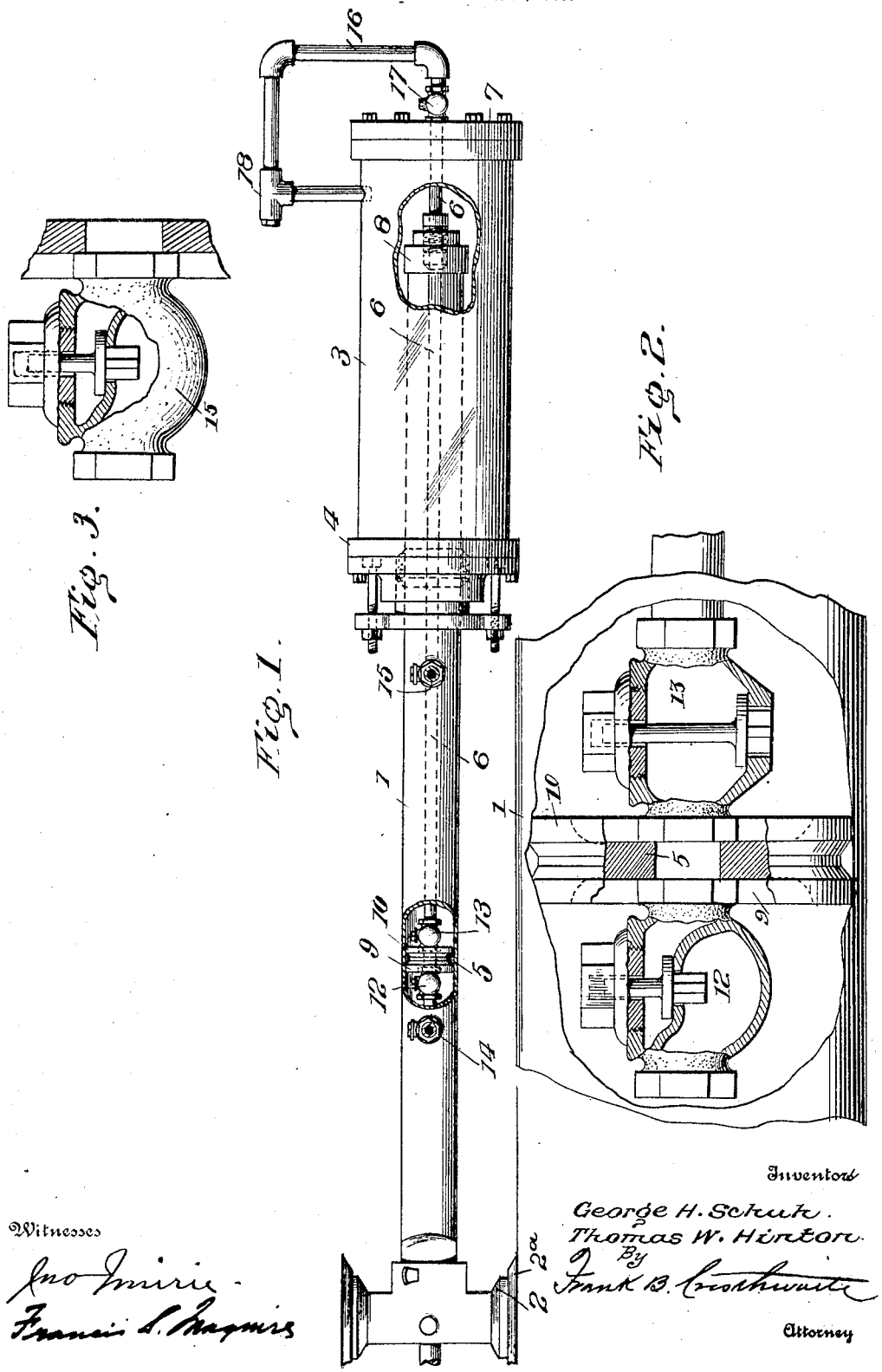

GEORGE HENERY SCHUH AND THOMAS WARD HINTON, OF EARL PARK, INDIANA.

AIR-PUMP.

No. 856,372.   Specification of Letters Patent.   Patented June 11, 1907.

Application filed August 10, 1905. Serial No. 273,665.

*To all whom it may concern:*

Be it known that we, GEORGE HENERY SCHUH and THOMAS WARD HINTON, of Earl Park, in the county of Benton and State of Indiana, have invented certain new and useful Improvements in Air-Pumps; and we do hereby declare the following to be a full, clear, and exact description of the invention, such as will enable others skilled in the art to which it appertains to make and use the same.

The object of this invention is to provide an improved pump especially designed to compress air, and so store the same that its supply as a motive fluid to effect mechanical operation will be constant and uniform and not in intermittent jets as is generally caused by the reciprocating action of the pump.

The invention will be hereinafter fully set forth and particularly pointed out in the claims.

In the accompanying drawing, Figure 1 is a view in side elevation, partly broken away, and illustrating an appropriate form of embodiment of the pump. Figs. 2 and 3 are enlarged views of the valve.

Referring to the drawing 1 designates the reciprocating cylinder secured at one end to a cross head 2 mounted in guides 2ª and designed to be operated by suitable means, not shown. The cylinder 1 extends into a storage tank 3, the inner head 4 of the latter having a gland and stuffing box to provide a bearing for the cylinder in its travel.

5 is the stationary piston within the cylinder, its tubular rod 6 being rigidly secured to the outer head 7 of the storage tank. The end 8 of the cylinder is provided with a gland and stuffing box forming a bearing for the cylinder in its reciprocation upon the piston rod, the extent of such reciprocation being within the length of the storage tank. The piston 5 comprises a pair of disks 9, 10, having an intermediate washer. The tubular rod 6 extends through the piston and the disk 9 is provided on its outer face with a valve 12 the passage through which is in alinement with that of rod 6.

13 is a second valve designed to establish communication between the cylinder and piston rod. It is shown upon the rod adjacent the outer face of disk 10 of the piston. The cylinder is formed with inlet ports controlled by valves 14, 15, spaced apart to a greater distance than the extent of reciprocation of the cylinder upon the piston. Valves 12, 13 may be termed the piston valves and valves 14, 15 the cylinder valves. Each is a one-way valve and in operation valves 13 and 14 are simultaneously unseated to entrain the air in the outward travel of the cylinder, and valves 12 and 15 are unseated in the inward travel, the respective complementary pairs of valves being held to their seats while air is being admitted through the other pair.

Extending from the outer head of the storage tank 3 is a pipe 16 which registers with the extremity of piston rod 6. This pipe is provided with a valve 17 permitting passage only from the piston rod. The pipe 16 conducts air from the piston rod to the storage tank and connections may be made from the union or "T" 18 to the mechanical apparatus for which the motive fluid may be available, or to conduct the latter to other storage receptacles.

From the foregoing the operation will be readily understood. The cross head being actuated to effect the inward travel of the cylinder, the parts will assume the positions shown in the drawing, the cylinder being illustrated as at the limit of its inward movement. During this movement air is forced into the cylinder through valve 15 and into the piston rod through valve 12, the cylinder valve 14 and piston valve 13 remaining seated. The air thus entering the piston rod is conducted to the storage tank. When the cylinder travels outwardly valve 14 admits air to the cylinder and valve 13 opens to allow the air to enter the piston rod, valves 12 and 15 being closed. Thus the constant reciprocation of the cylinder causes a continued supply of air to the piston rod. The air stored within the tank 3 may obviously be drawn out in any desired quantity and its flow therefrom may be uniform and not affected by the slight variations in the supply to the tank owing to the reciprocation of the cylinder.

We claim as our invention:—

1. In an air pump, the combination with the reciprocating cylinder and the stationary piston therein, said cylinder having inlet valves, and a tubular piston rod having inlet valves on both sides of said piston, of a relatively stationary compartment having a bearing in which said cylinder is designed to reciprocate, means for rigidly mounting said piston rod in said stationary compartment, and means for reciprocating said cylinder.

2. In an air pump, the combination with the reciprocating cylinder and the stationary piston therein, said cylinder having inlet valves, and a tubular piston rod having inlet valves on both sides of said piston, of a relatively stationary storage tank having a bearing in which said cylinder is designed to reciprocate, means for rigidly mounting said piston rod in said storage tank, a pipe leading from the outlet end of said piston rod to said storage tank, and means for reciprocating said cylinder.

3. In an air pump, the combination with the reciprocating cylinder and the stationary piston therein, said cylinder having inlet valves, and a tubular piston rod having inlet valves on both sides of said piston, of a relatively stationary storage tank having a bearing in its inner head in which said cylinder is designed to reciprocate, said tubular piston rod being mounted in the outer head of said storage tank, a bearing on the end of said cylinder within said storage tank, a pipe establishing communication between said piston rod and said storage tank, a valve controlling the passage through said pipe, and means for reciprocating said cylinder.

In testimony whereof, we have signed this specification in the presence of two subscribing witnesses.

GEORGE HENERY SCHUH.
THOMAS WARD HINTON.

Witnesses:
JAMES C. MAY,
JOHN H. RUDE.